United States Patent [19]

Hitz

[11] Patent Number: 5,265,917

[45] Date of Patent: Nov. 30, 1993

[54] QUICK-ACTING, SEALED CONNECTION

[76] Inventor: Gifford L. Hitz, 1661 Bel Air Rd., Los Angeles, Calif. 90024

[21] Appl. No.: 997,491

[22] Filed: Dec. 28, 1992

[51] Int. Cl.⁵ .............................................. F16L 55/00
[52] U.S. Cl. ..................................... 285/86; 285/315; 285/320
[58] Field of Search ................... 285/373, 419, 83, 86, 285/315, 102, 35, 306, 320, 421

[56] References Cited

U.S. PATENT DOCUMENTS

| | | |
|---|---|---|
| 591,828 | 10/1897 | Duncan . |
| 969,943 | 9/1910 | Cronholm . |
| 1,725,713 | 8/1929 | Jobe . |
| 1,866,160 | 7/1932 | Griswold, Jr. . |
| 1,965,273 | 7/1934 | Wilson . |
| 2,211,983 | 8/1940 | Parris . |
| 2,327,714 | 8/1943 | Iftiger .................................. 285/35 |
| 2,338,307 | 1/1944 | Staggers . |
| 2,341,629 | 2/1944 | Kreidel . |
| 2,818,055 | 12/1957 | Hovde . |
| 2,898,000 | 8/1959 | Hanny . |
| 3,149,860 | 9/1964 | Hallesy . |
| 3,217,922 | 11/1965 | Glasgow . |
| 3,240,520 | 3/1966 | Dailey et al. ..................... 285/320 x |
| 3,307,861 | 3/1967 | Adam et al. . |
| 3,507,506 | 4/1970 | Tillman, III . |
| 3,630,553 | 12/1971 | Foulger . |
| 3,687,487 | 8/1972 | Lindholm . |
| 4,159,132 | 6/1979 | Hitz . |
| 4,193,617 | 3/1980 | Hitz . |
| 4,557,508 | 12/1985 | Walker ............................. 285/315 X |
| 4,667,986 | 5/1987 | Johnson et al. ..................... 285/83 X |
| 4,693,497 | 9/1987 | Pettus et al. ..................... 285/320 X |
| 4,730,853 | 3/1988 | Gjessing ............................ 285/320 X |

FOREIGN PATENT DOCUMENTS

| | | |
|---|---|---|
| 23943 | 5/1901 | Switzerland . |
| 528039 | 10/1972 | Switzerland . |
| 349421 | 5/1931 | United Kingdom . |
| 866626 | 4/1961 | United Kingdom . |

Primary Examiner—Dave W. Arola
Attorney, Agent, or Firm—William W. Haefliger

[57] ABSTRACT

A sealed connection for two cylindrical members defining an axis, and in combination with the members comprising at least two semi-cylindrical connector sections sized to fit about the members, the sections forming multiple projections that extend radially inwardly and generally annularly about the axis, the projections spaced apart in an axial direction on each of the sections in meshing interengagement with corresponding projections on the members that project radially outwardly, with the sections bridging the joint between the members, whereby the members are held against relative axial separation, the projections in the sections having annular extents about the axis; generally annular retaining ring structure extending annularly about the sections and having wedging engagement therewith to block outward movement of the sections that would tend to relieve such meshing interengagement; there being sealing structure at the joint between the members and compressed by the members when the sections are fully assembled thereto; the sections having intermediate portions bridging the joint between the members, certain of the projections located on one axial side of the intermediate portions, and others of the projections located on the opposite axial side of the intermediate portions; the sections and one member providing pivot structure allowing the sections to pivot relative to the member, for disengaging the meshing interengagement when the retaining structure is axially displaced, whereby the member may be relatively separate.

9 Claims, 3 Drawing Sheets

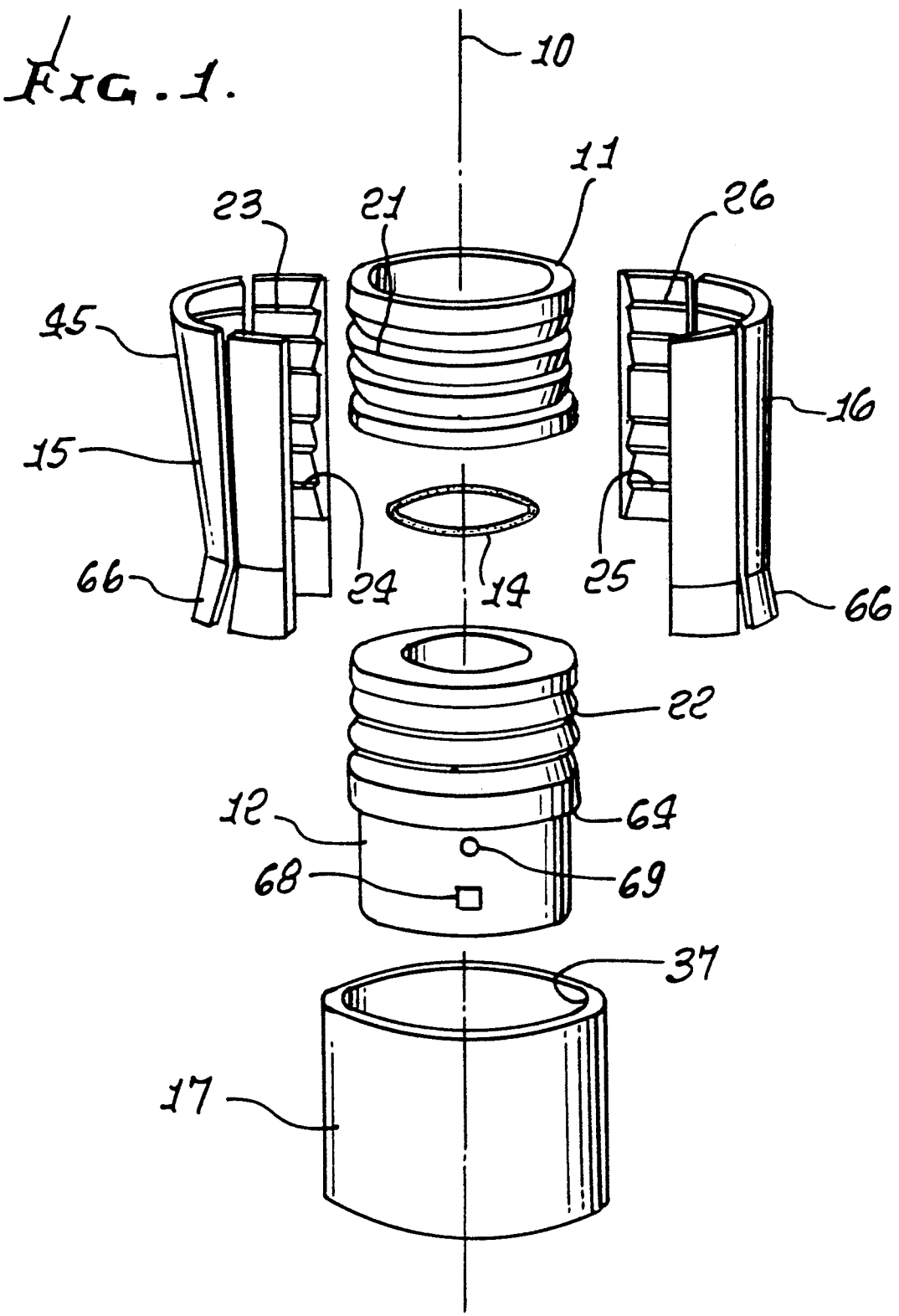

U.S. Patent  Nov. 30, 1993  Sheet 2 of 3  5,265,917
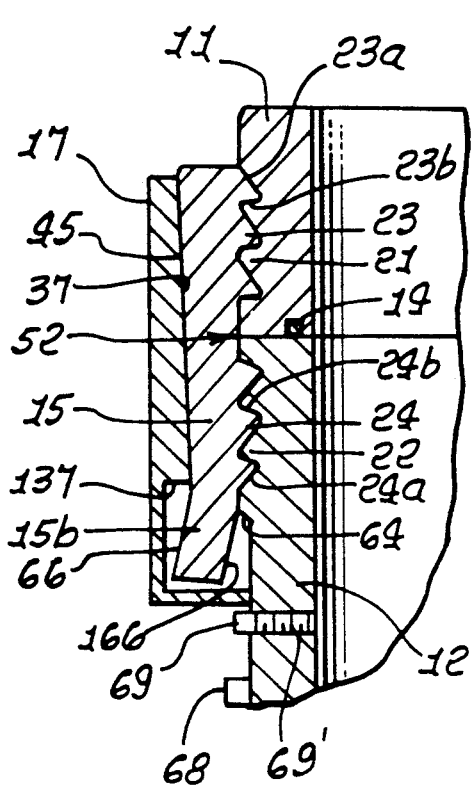
FIG. 3.
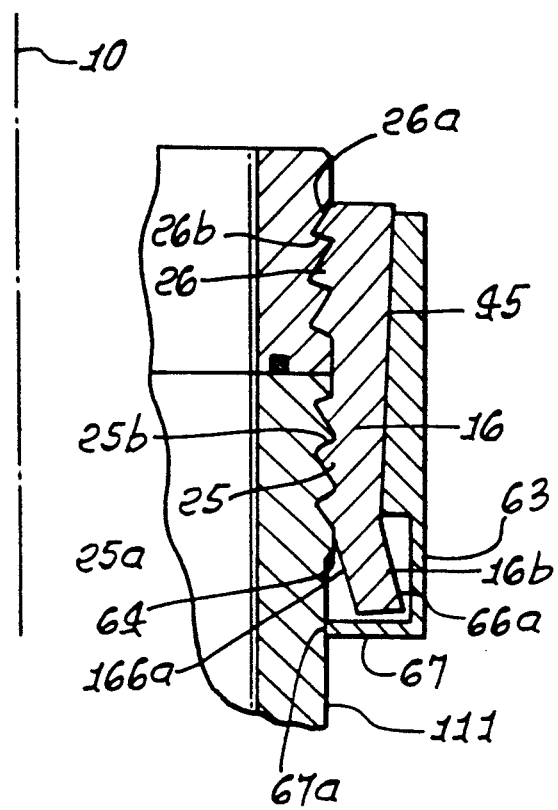
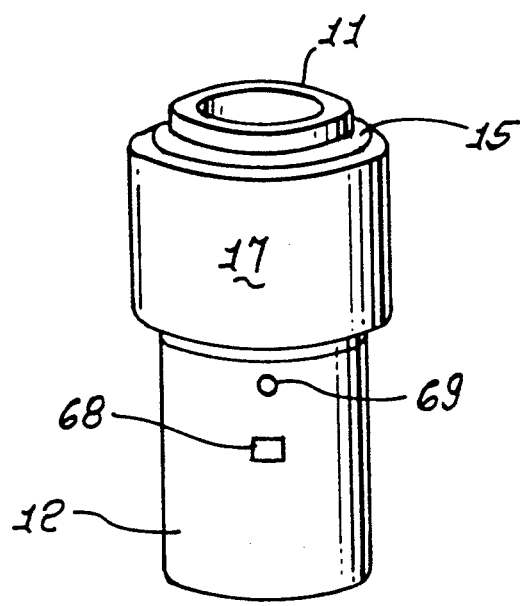
FIG. 2.

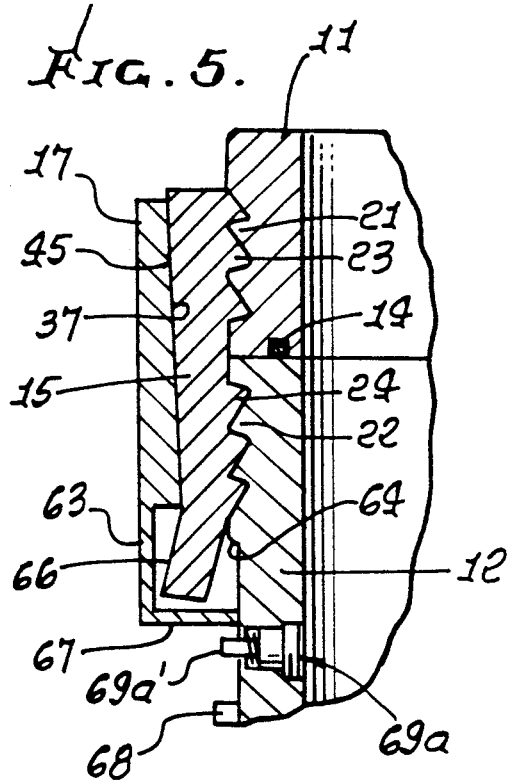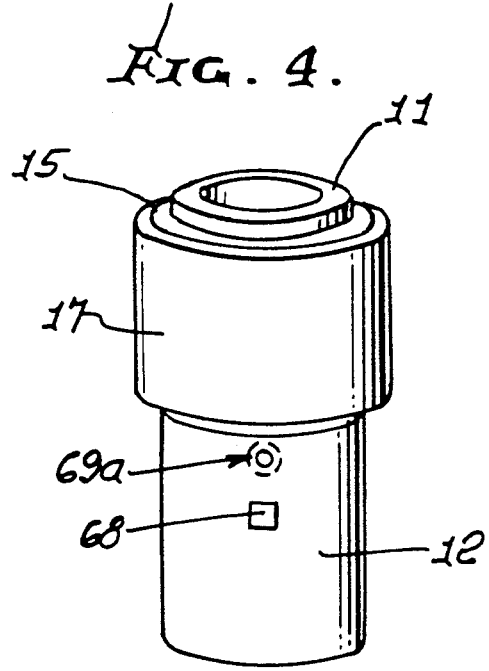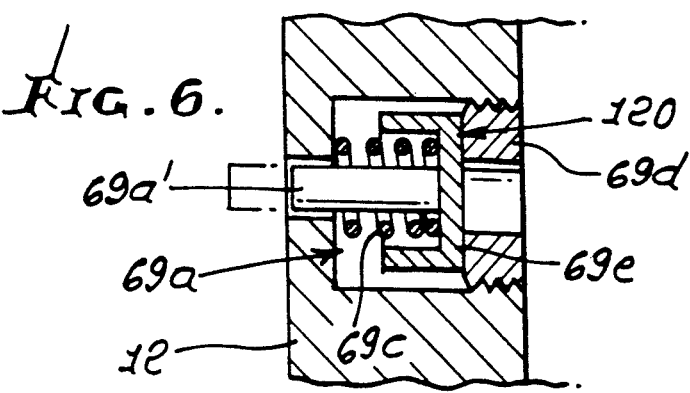

QUICK-ACTING, SEALED CONNECTION

BACKGROUND OF THE INVENTION

This invention relates generally to high or medium pressure connections which can be coupled and uncoupled, as the need requires, easily and quickly, leaving no loose and separate parts.

Previous devices, as referred to in my U.S. Pat. No. 4,159,132, have been less than satisfactory, due to loose parts which are separated from the coupling when disassembled. The disclosure of U.S. Pat. No. 4,159,132 may be considered as incorporated herein, and the present invention improves upon that of said patent.

SUMMARY OF THE INVENTION

The present invention has for its major object the provision of a reliable, compact means for joining two sections of pressure vessels or piping in such a manner that the sections can be joined or separated, as required, quickly and effectively, by such means as will circumvent or eliminate the prior problems mentioned above, as well as others.

Basically, the sealed connection for two cylindrical members extending axially comprises:

a) at least two semi-cylindrical sections sized to fit about the members, the sections forming projections that extend radially inwardly and generally annularly about the axis, the projections spaced apart in an axial direction on each of the sections for meshing interengagement with corresponding projections on the members that project radially outwardly, with the sections bridging the joint between the members, whereby the members are held against relative axial separation, b) generally annular retaining ring means extending annularly about the sections and having wedging engagement therewith to block outward movement of the sections that would tend to relieve the meshing interengagement, c) there being sealing means at the joint between the members and compressed by the members when the sections are fully assembled thereto, d) said sections having intermediate portions bridging said joint between the members, certain of said projections located on one axial side of said intermediate portions, and others of said projections located on the opposite axial side of said intermediate portions, e) said sections and one member providing pivot structure allowing the sections to pivot relative to the member, for disengaging said meshing interengagement when said retaining means is axially displaced, whereby the members may be relatively separated.

Typically, the retaining means includes a ring having an axially tapered bore, and said sections have outer surfaces which are axially tapered in a first mode to fit said tapered bore, and which are also axially tapered in a second mode to be engaged by said retaining means to pivot the said sections on one member when the retaining ring is displaced axially. Also, the means may comprise pipe members, or vessels.

Additional objects include the provision of pivot structure in the form of intergageable shoulders on the one member and on the sections, the shoulders protected by an extension on the retaining ring means. Lock means is also provided.

These and other objects and advantages of the invention, as well as the details of illustrative embodiments will be more fully understood from the following detailed description of the drawings, in which:

DRAWING DESCRIPTION

FIG. 1 is an exploded perspective showing a vessel assembly incorporating the invention;

FIG. 2 is a view showing the completed assembly with a keeper ring drawn down over the assembly;

FIG. 3 is an enlarged fragmentary section showing in detail the relative positions of the main bodies, the coupling sections, and the retaining keeper;

FIG. 4 is a view like FIG. 2 but showing a modification;

FIG. 5 is an enlarged fragmentary section like FIG. 3 but showing the modification of FIG. 4; and FIG. 6 is an enlarged section showing a safety lock.

DETAILED DESCRIPTION

In FIG. 1, the sealed connection or assembly includes two cylindrical members 11 and 12, such as a vessel or vessel member, or closure plug members defining a common axis 10. Two or more semi-cylindrical connector or coupling sections, as at 15 and 16, are provided and sized to fit about the members 11 and 12.

The sections 15 and 16 form projections, as at 23 and 24, on section 15, and at 25 and 26 on section 16. See also FIG. 3. Such projections extend radially inwardly and generally annularly about axis 10. Also, they are spaced apart in an axial direction on each section for meshing interengagement with corresponding projections 22 and 21 on the respective ends of the vessel and closure plug members 12 and 11. Projections 22 and 21 are also annular, and they project annularly outwardly.

In the fully assembled connection, the sections 15 and 16 bridge the joint between the members 11 and 12, as is clear from FIGS. 3, 4 and 5. Sealing means, such as a gasket 14, is provided at the joint between members 11 and 12 when the sections 15 and 16 are assembled to members, as described.

Note that certain projections, as at 23 and 26, on the sections 15 and 16 have first annular flanks 23a and 26a which face away from the joint area 52. Such flanks angled radially inwardly and in one direction toward the joint area. Those projections also have second and opposite flanks, as at 23b and 26b, which face toward the joint and extend generally radially inwardly. Other projections, as at 24 and 25, on the sections 15 and 16 have first annular flanks 24a and 25a which also face away from the joint area, such flanks angled radially inwardly and in the opposite axial direction toward the joint area. Those projections also have second flanks, as at 24b and 25b, which face toward the joint and extend generally radially inwardly. As a result, the projections on the sections 15 and 16 cam on the corresponding projections on the vessel and closure plug members, to urge or draw such members endwise relatively together, as the coupling sections are displaced radially inwardly upon assembly. Flanks 23a, 24a, 25a, and 26a advantageously extend at an angle of +5 to +45 from planes 110 normal to axis 10, as seen in FIG. 3; and flanks 23b, 24b, 25b and 26b advantageously extend at an angle of about −5 to −10 from such planes, for best results.

Also provided is generally annular retaining ring means extending annularly about the sections 15 and 16, and having wedging engagement therewith, to block outward movement of the sections that would tend to relieve the meshing interengagement referred to, or that would tend to relieve the seal established between the ends of the members, as will be described. As shown in FIGS. 1, 4 and 5, the retaining ring means includes a ring 17 having an axially tapering bore 37; and the sections 15 and 16 have outer surfaces at 45 which are axially tapered to fit the ring bore. Therefore, as the ring is displaced axially into wedging engagement with the sections, they are urged inwardly as to the positions shown. Bore 37 is tapered downwardly and inwardly.

The tapered sections 15 and 16 have lower extensions 15b and 16b, with additional outer surfaces, as at 66 and 66a tapered, as shown, upwardly and inwardly; thus, 66 and 66a flare downwardly. When the retaining ring 17 is displaced axially in the opposite direction to that which urges the sections 15 and 16 inwardly, i.e., downwardly in FIG. 3, the outer surfaces 66 and 66a are acted upon by the retaining ring 17 to cause the sections 15 and 16 to pivot radially outwardly at points 64 on 12, to an extent such that the projections 21 and 22 are no longer in meshing engagement with the grooves in the upper member 11, thus allowing the upper member 11 to be separated from the lower member 12. In this regard, annular shoulder 137 on ring 17 engages flared surfaces 66 and 66a on 15b and 16b, to cause pivoting engagement of inner and downwardly flared surfaces 166 and 166a (on 66 and 66a) to pivot on or about points or shoulder 64, as referred to.

The sections 15 and 16 are retained in partial contact with the lower member 12 by the retaining ring surfaces 37, during such pivoting.

The retaining ring 17 has a downwardly extended, thinner, annular wall portion, as at 63, which captivates the extensions 15b and 16b from separating from the lower member 12, when the retaining ring is displaced axially (downwardly in FIG. 3) to allow release of the upper member 11.

The retaining ring 17 also has a guide member 67 projecting radially inwardly from 63, axially about axis 10, and which acts to guide the axial movement of the retaining ring in a direct path, as by sliding engagement of bore 67a with cylindrical surface 111 on 12.

A stop part or lug to prevent the retaining ring from moving too far in the releasing direction is provided, as at 68. Member 67 engages 68 to stop such ring 17 displacement.

A safety lock as shown at 69, FIG. 3, is provided to prevent the retaining ring from being axially displaced to release the upper member 19 when the assembly is pressurized. The safety lock may be comprised of a pipe plug, which can be threadably rotated inwardly (see thread 69') toward the axis 10 to provide an opening from the interior of the assembly, thus insuring that the upper member cannot be released until the assembly is de-pressurized; and also, that the assembly cannot be pressurized until the safety lock is securely in place to obstruct axial movement of the retaining ring.

An alternate safety lock 69a is illustrated in FIGS. 4-6, and comprises a check valve 120, with protruding stem 69a', which is pressure activated to move outwardly axially when the assembly is pressurized, thus obstructing the axial displacement of the retaining ring when the assembly is pressurized, and which protrusion is retracted by means of a spring 69c when the assembly is no longer pressurized. A threaded, tubular plug seating the plate 69e can be removed to provide access to members 120, 69a' and 69c, for installation and servicing.

We claim:

1. In a sealed connection for two cylindrical members defining an axis, and in combination with said members, the combination comprising
   a) at least two semi-cylindrical connector sections sized to fit about said members, said members having axially spaced apart radially outwardly extending projections, said sections forming multiple projections that extend radially inwardly and generally annularly about said axis, said projections spaced apart in an axial direction on each of the sections in meshing interengagement with said axially spaced apart radially outwardly extending projections on the members, with said sections bridging the joint between said members, whereby the members are held against relative axial separation, said projections in the sections having annular extents about said axis,
   b) generally annular retaining ring means extending annularly about said sections and having wedging engagement therewith to block outward movement of the sections that would tend to relieve such meshing interengagement,
   c) there being sealing means at the joint between the members and compressed by the members when the sections are fully assembled thereto,
   d) said sections having intermediate portions bridging said joint between the members, certain of said projections located on one axial side of said intermediate portions, and others of said projections located on the opposite axial side of said intermediate portions,
   e) said sections and one member providing pivot structure allowing the sections to pivot relative to the member, for disengaging said meshing interengagement when said retaining means is axially displaced, whereby the members may be relatively separated,
   f) said retaining means including a retaining ring having an axially tapered bore, and said sections have certain outer surfaces which are axially tapered in a first mode in one direction to fit said ring tapered bore, and other outer surfaces which are also axially tapered in a second mode in said one direction to be engaged by said retaining means to pivot the said sections on one member when the retaining ring is displaced axially,
   g) said pivot structure comprising interengageable shoulders on said one member and on said sections,
   h) the retaining means having a protective first annular wall extending in said one direction and bounding said other outer surfaces on said sections, and a protective second wall which projects radially inwardly from said first wall to captivate said other outer surfaces,
   i) and there being a guide bore on said second wall which is slidable axially along an extended surface defined by said one member.

2. The combination of claim 1 wherein said certain and other projections have first annular flanks.

3. The combination of claim 1 wherein said one member is a lower member, and the other of said members is an upper member, said second wall located immediately below said other outer surfaces.

4. The combination of claim 1 wherein said members comprise vessels.

5. The combination of claim 1 wherein said members comprise vessel and a closure plug.

6. The combination of claim 1 wherein said members comprise pipes.

7. The combination of claim 1 wherein said axial taper in said second mode defines a flare extending away from said axis, in the direction of said retaining means displacement to facilitate said pivoting.

8. The combination of claim 1 including a safety lock on said one member to block said ring means from sliding when said members receive interior fluid pressure.

9. The combination of claim 1 wherein there are only two of said sections, each extending approximately half way around said axis.

* * * * *